US012799962B2

(12) United States Patent
Beyer

(10) Patent No.: US 12,799,962 B2
(45) Date of Patent: Nov. 17, 2026

(54) CLIP RETAINERS FOR RIB ATTACHMENT

(71) Applicant: Illinois Tool Works Inc., Glenview, IL (US)

(72) Inventor: Mark A. Beyer, Troy, MI (US)

(73) Assignee: Illinois Tool Works Inc., Glenview, IL (US)

( * ) Notice: Subject to any disclaimer, the term of this patent is extended or adjusted under 35 U.S.C. 154(b) by 306 days.

(21) Appl. No.: 18/538,404

(22) Filed: Dec. 13, 2023

(65) Prior Publication Data

US 2024/0200588 A1 Jun. 20, 2024

Related U.S. Application Data

(60) Provisional application No. 63/433,517, filed on Dec. 19, 2022.

(51) Int. Cl.
*F16B 5/06* (2006.01)

(52) U.S. Cl.
CPC .................................... *F16B 5/065* (2013.01)

(58) Field of Classification Search
CPC .......................... F16B 65/065; F16B 65/0657; F16B 65/0664; F16B 65/0621; F16B 2/245; F16B 2/24; F16B 2/241; F16B 5/0607; F16B 5/065; F16B 5/0657; F16B 5/0664; F16B 5/0621; B60R 13/0206; B60R 2011/0059; B60R 2011/0071; B60R 2013/0807; Y10T 403/33; Y10T 403/3357; Y10T 403/7047; Y10T 403/7061; Y10T 403/7075; Y10T 403/7092
See application file for complete search history.

(56) References Cited

U.S. PATENT DOCUMENTS 5,533,237 A * 7/1996 Higgins ................ F16B 21/075 24/297
10,968,931 B1 * 4/2021 Forti ....................... F16B 5/065
11,420,571 B1 8/2022 Spearing
11,746,812 B2 * 9/2023 Forti ..................... F16B 5/0657 24/292
2017/0114809 A1 4/2017 Stickelberger
2019/0271339 A1 * 9/2019 Benedetti ................ F16B 2/245

* cited by examiner

*Primary Examiner* — Josh Skroupa
*Assistant Examiner* — Almutasim Hezam Aiyash
(74) *Attorney, Agent, or Firm* — McAndrews, Held & Malloy, Ltd.

(57) ABSTRACT

Disclosed is a clip assembly to couple a first component to a second component having a rib. The clip assembly includes an inner clip and an outer clip. The inner clip includes a pair of rigid legs defining an inner-clip channel. The inner-clip channel receives at least a portion of the rib. The outer clip includes a pair of opposing legs resiliently connected via a connecting portion and defines an outer-clip channel, one or more spring tabs, and one or more barbed tabs. The outer-clip channel receives at least a portion of the inner clip. The one or more spring tabs engage and secure the inner clip relative to the outer clip. The one or more barbed tabs engage and secure the rib relative to the outer clip.

19 Claims, 16 Drawing Sheets

CLIP RETAINERS FOR RIB ATTACHMENT

CROSS-REFERENCE

The present application claims priority to U.S. Provisional Patent Application No. 63/433,517, filed Dec. 19, 2022, and entitled "Clip Retainers for Rib Attachment," which is hereby incorporated by reference in its entirety.

BACKGROUND

Automotive components require fastening techniques that are simple to manufacture and assemble. Further, fastening techniques should above all be reliable and efficient. A clip assembly can be used to make a connection between components, such as automotive panels.

While the applications can vary greatly, such retainer clips are sometimes used to attach one component (e.g., a panel) to another component (e.g., a frame or other support structure). For example, in the context of automotive manufacturing, a frame is a structure that serves as a backbone of a vehicle or component thereof, providing support and a rigid structure to which other components, such as the engine, suspension, interior components, and body panels, are attached. Traditionally, such frames and other vehicular support structures were fabricated using metal tubing (e.g., square or rectangular tubing) and/or sheet metal that is bent, welded, and/or otherwise joined to one another to form a frame or other support structure. Often, these structures would include one or more openings configured to receive a clip assembly.

In recent years, however, there has been a shift from tubular and/or sheet metal based structures to structures to cast structures. A cast structure, in an automotive context, refers to a vehicle frame or chassis that is produced using a casting process. The choice of metal for casting can vary but often includes materials like iron or aluminum. Given the nature of cast structures, manufacturers are less inclined to cut, drill, or otherwise form openings configured to receive a clip assembly.

Therefore, despite advancements to date, it would be highly desirable to have a clip assembly that is configured to attach to a structure without requiring an opening formed therein.

SUMMARY

The present disclosure relates generally to a fastening system to form a connection between two components, such as vehicular components, using a clip assembly, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

Figure 1A:
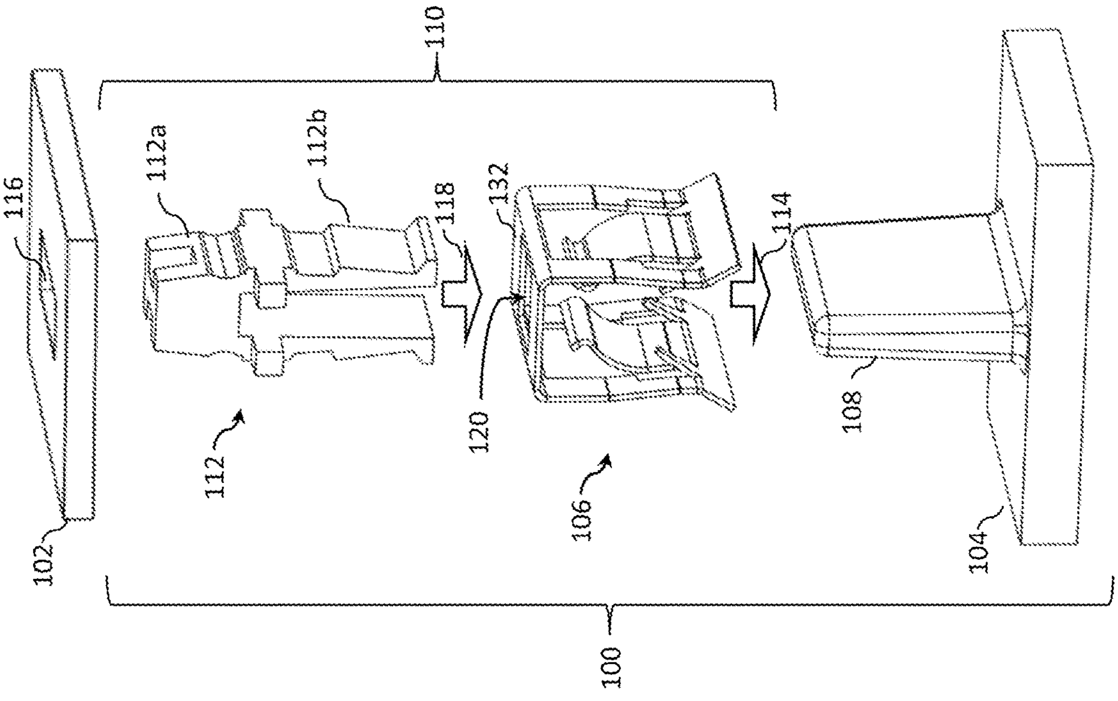

FIG. 1*a* illustrates an isometric assembly view of the fastening system in accordance with an aspect of this disclosure.

Figure 1B:
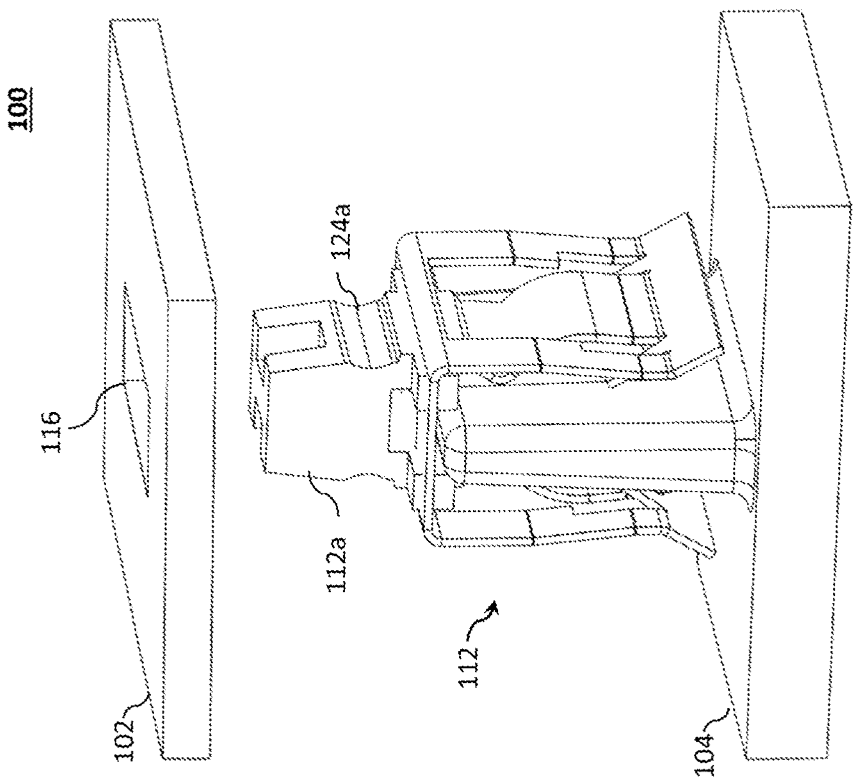

FIG. 1*b* illustrates an assembled isometric view of the fastening system.

Figure 1D:
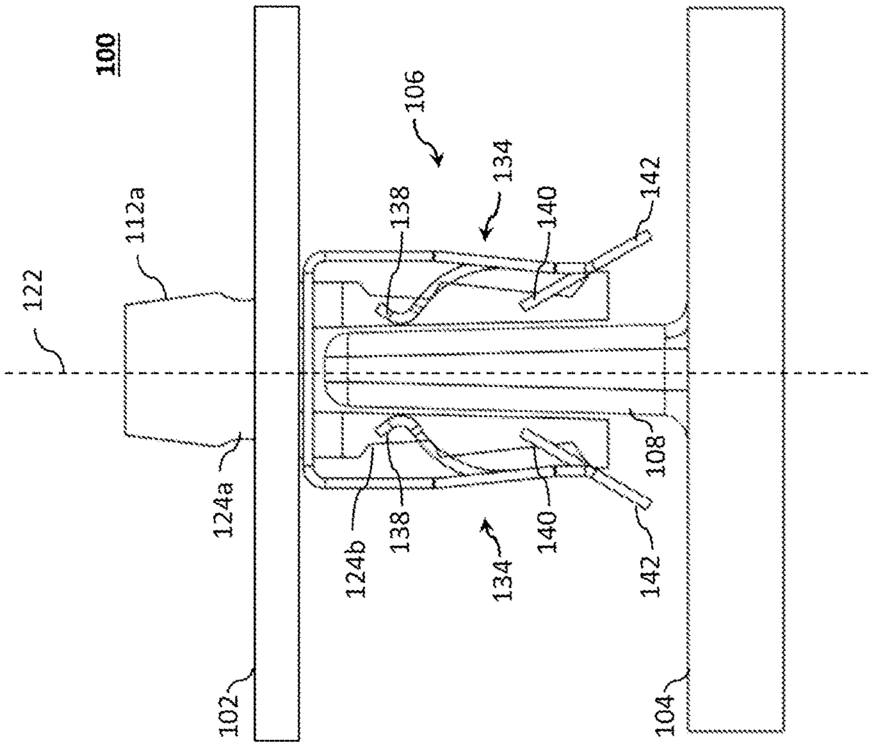
Figure 1C:
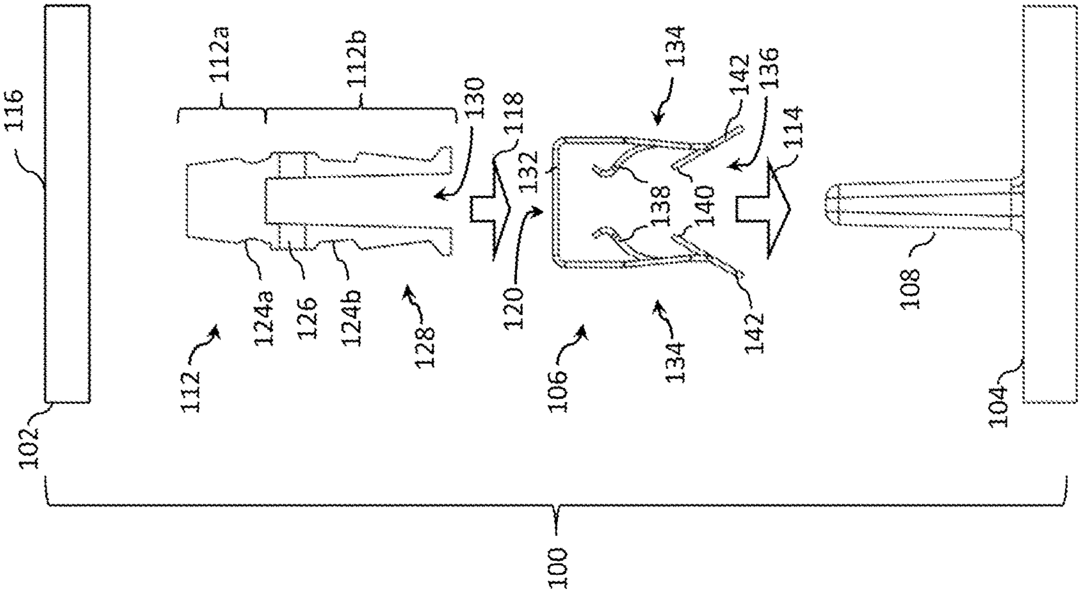

FIG. 1*c* illustrates an elevation assembly view of the fastening system.

FIG. 1*d* illustrates an elevation assembled view of the fastening system.

Figure 2A:
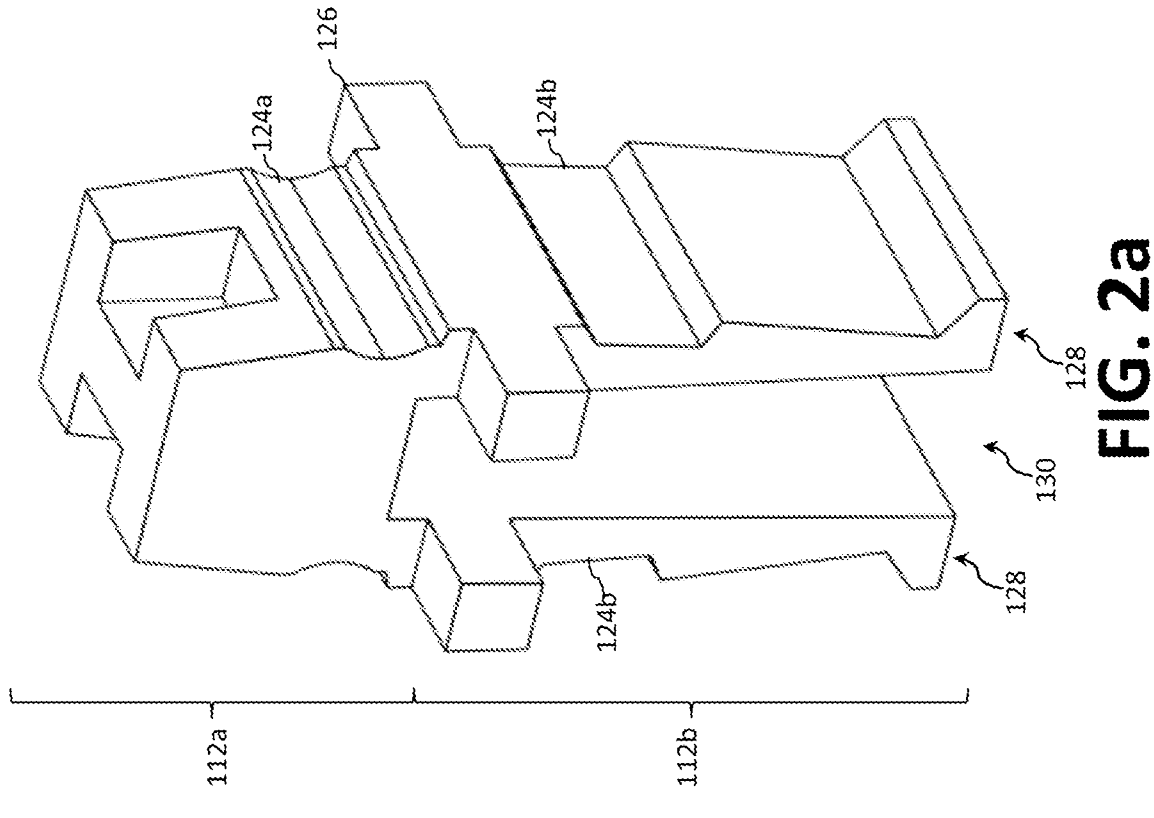

FIG. 2*a* illustrates a topside isometric view of the inner clip of FIGS. 1*a* through 1*d*.

Figure 2B:
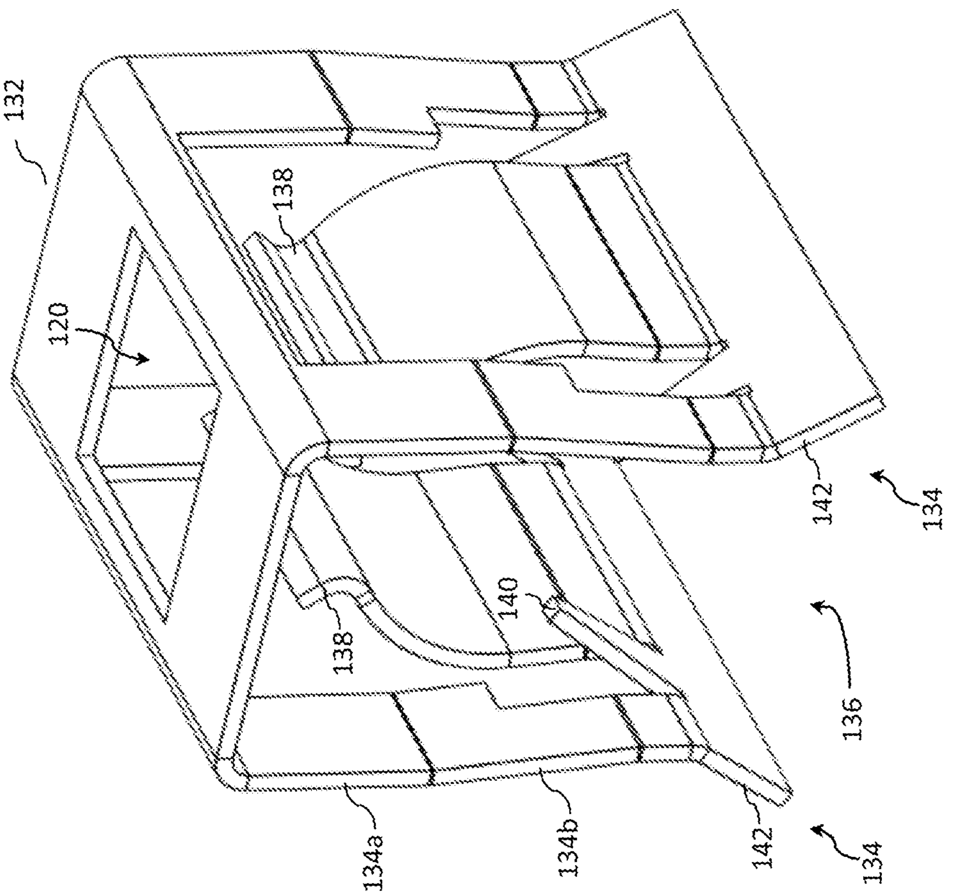
Figure 2D:
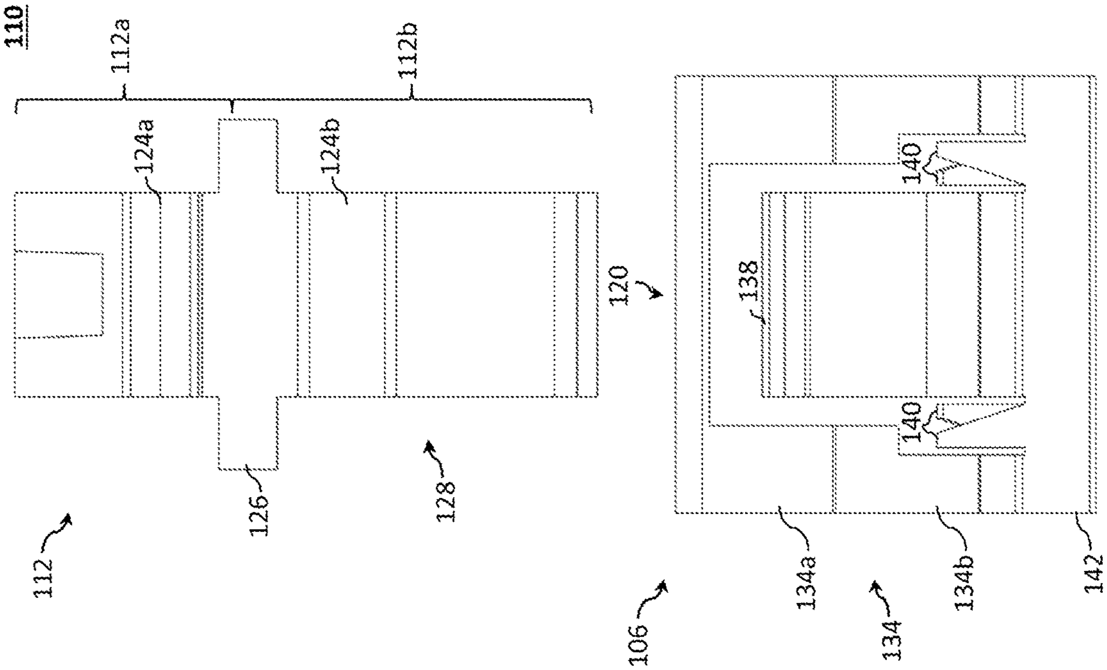
Figure 2C:
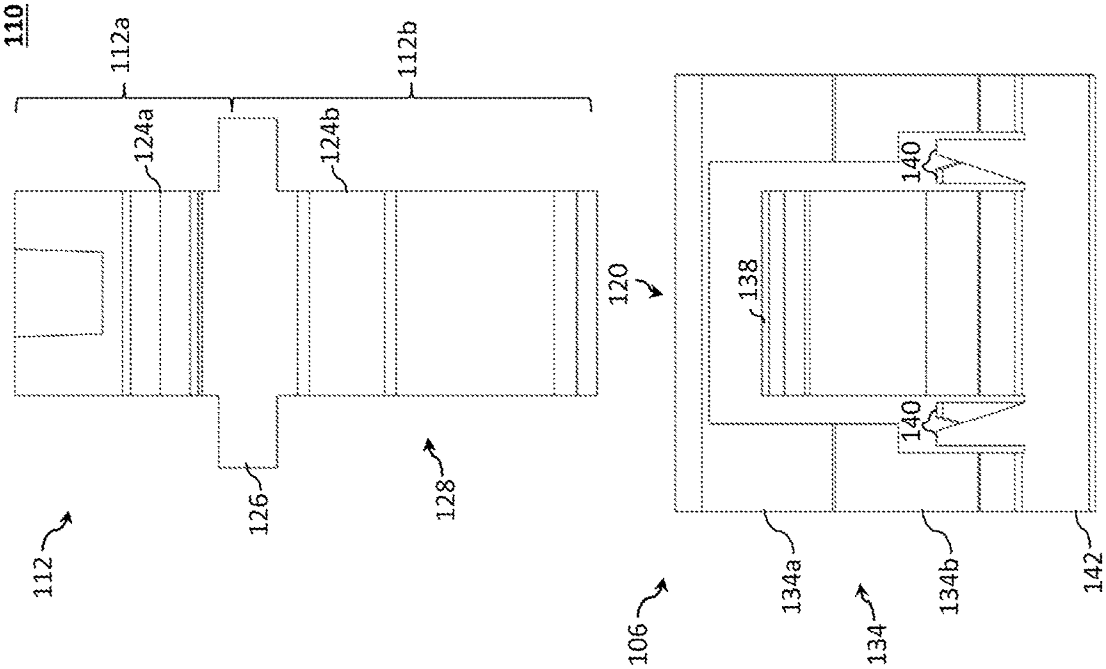

FIG. 2*b* illustrates a topside isometric view of the outer clip.

FIGS. 2*c* through 2*f* illustrate first, second, third, and fourth side elevation assembly views of the clip assembly.

Figure 2F:
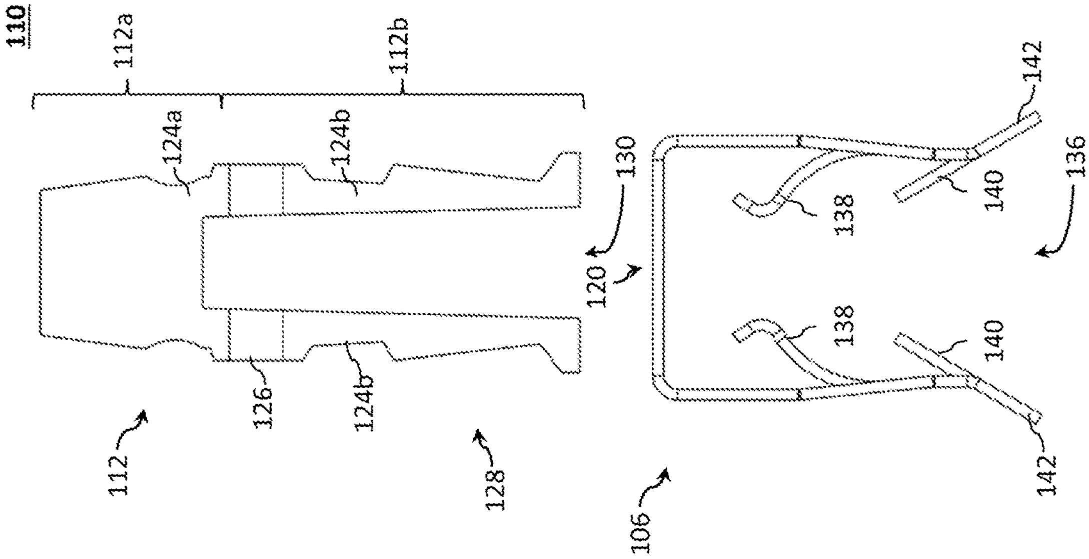
Figure 2E:
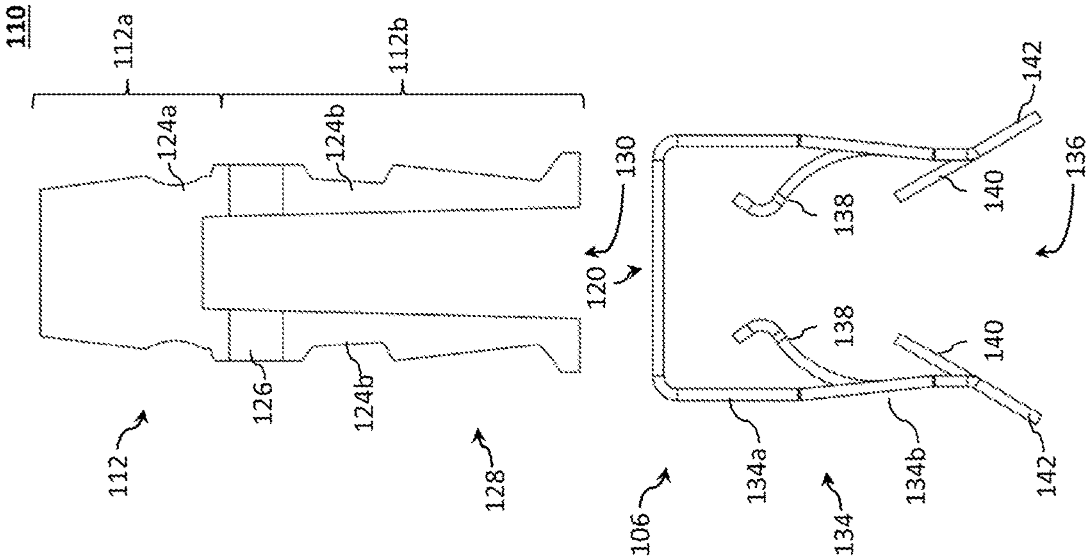
Figure 2G:
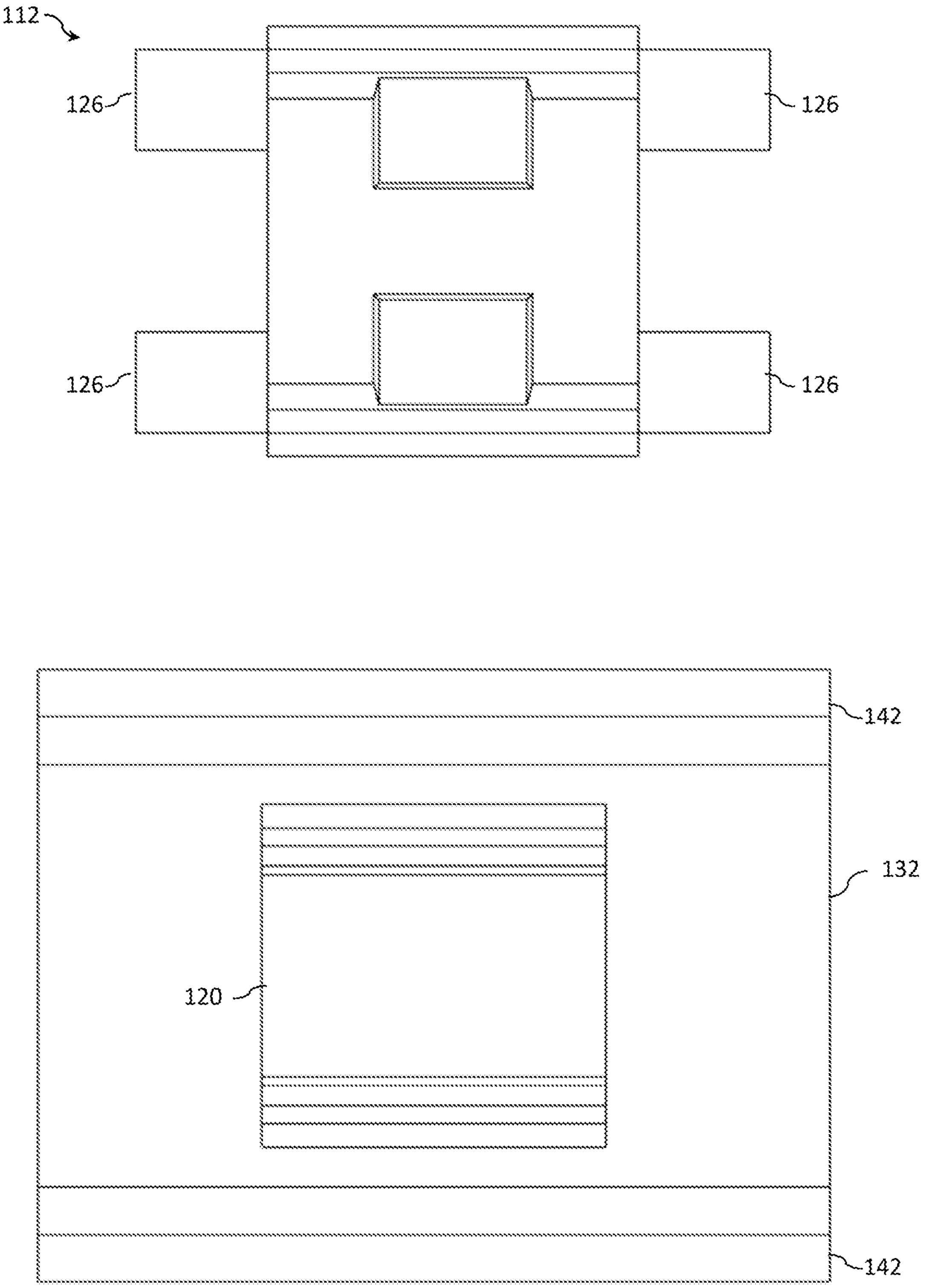

FIG. 2*g* illustrates top plan views of the inner and outer clips.

Figure 2H:
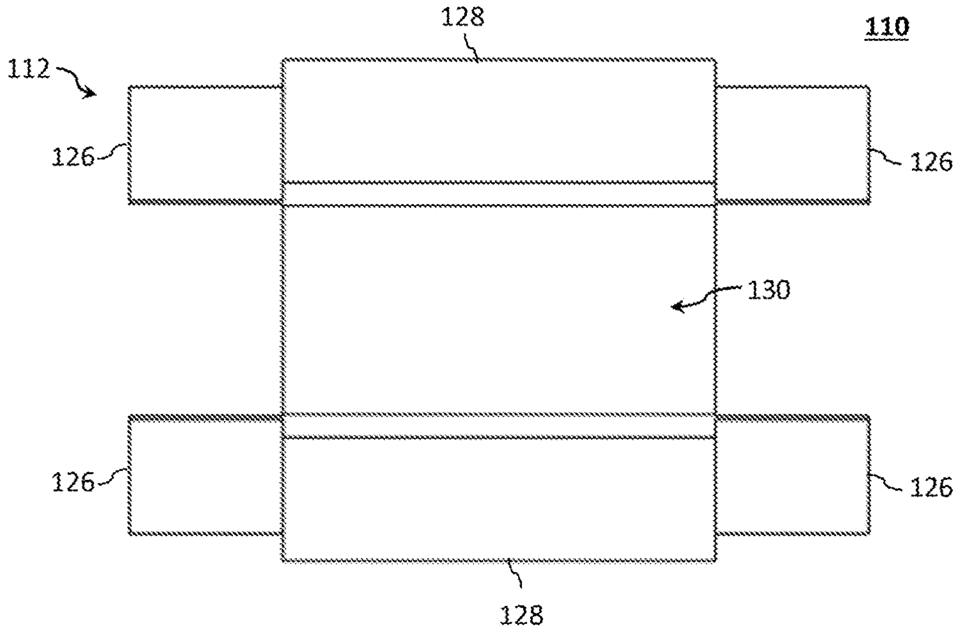
Figure 2H:
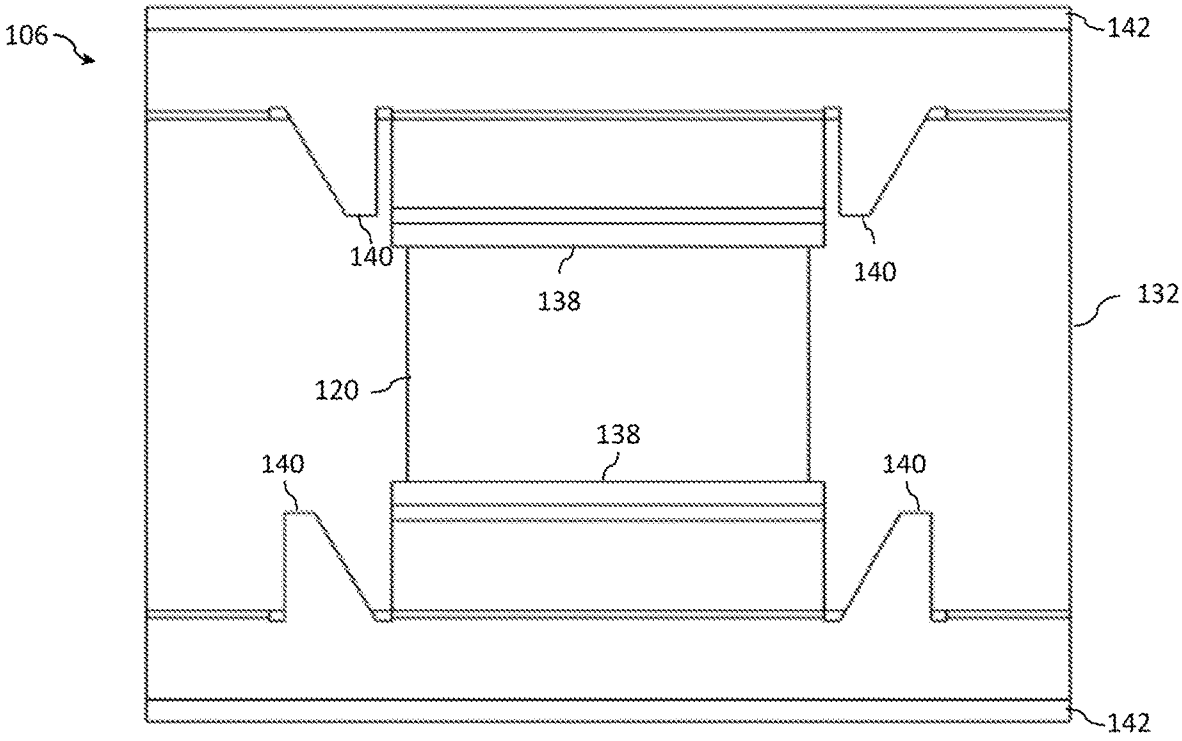

FIG. 2*h* illustrates bottom plan views of the inner and outer clips.

Figure 3A:
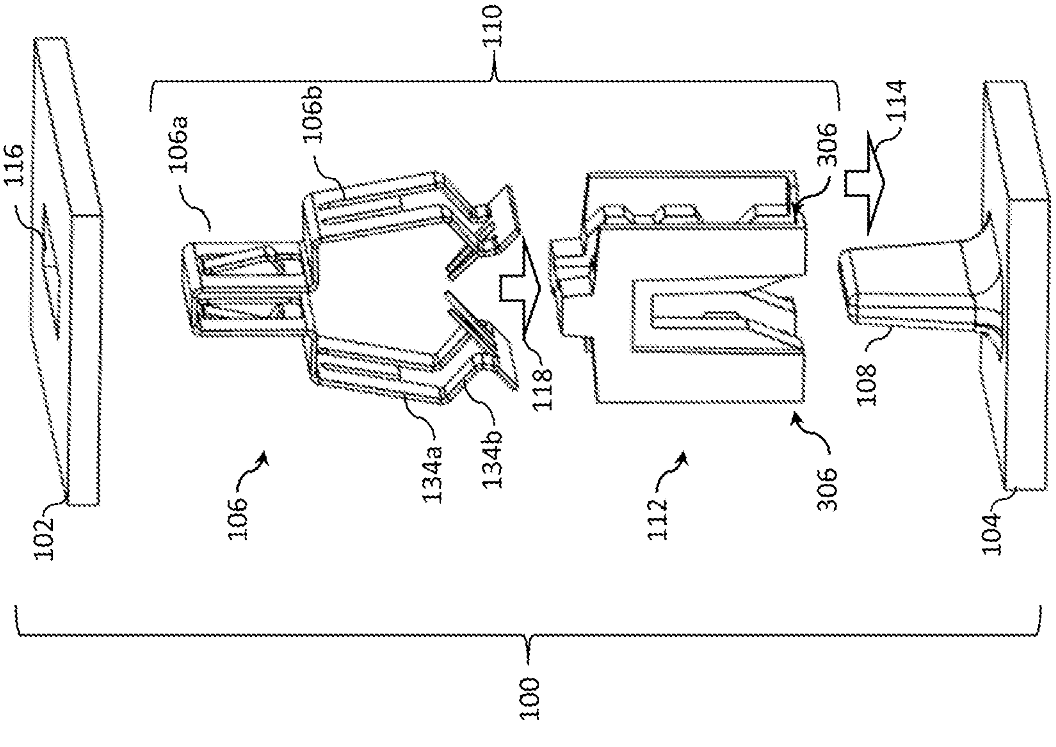

FIG. 3*a* illustrates an isometric assembly view of the fastening system in accordance with another aspect of this disclosure.

Figure 3B:
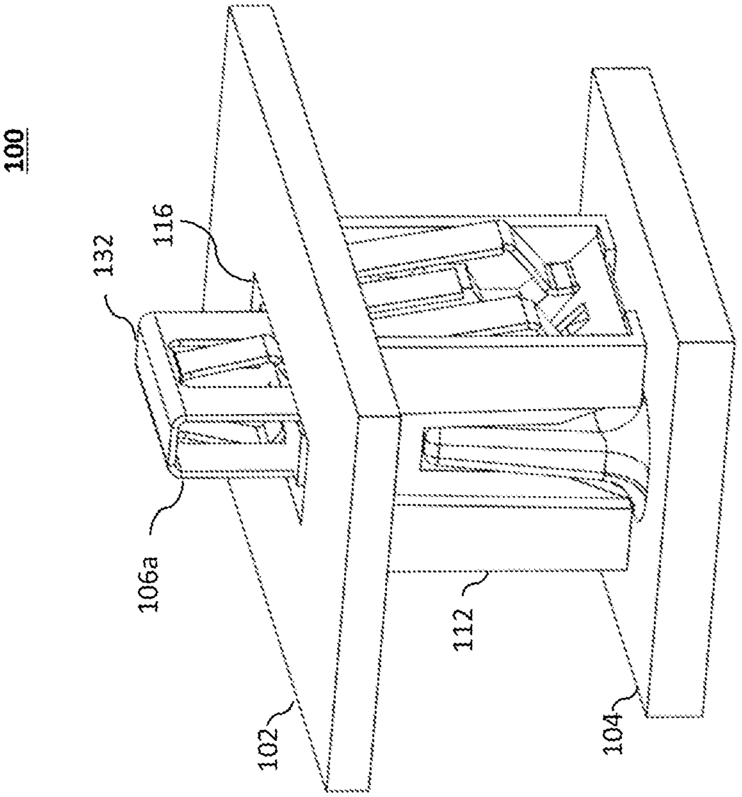

FIG. 3*b* illustrates an assembled isometric view of the fastening system.

Figure 3C:
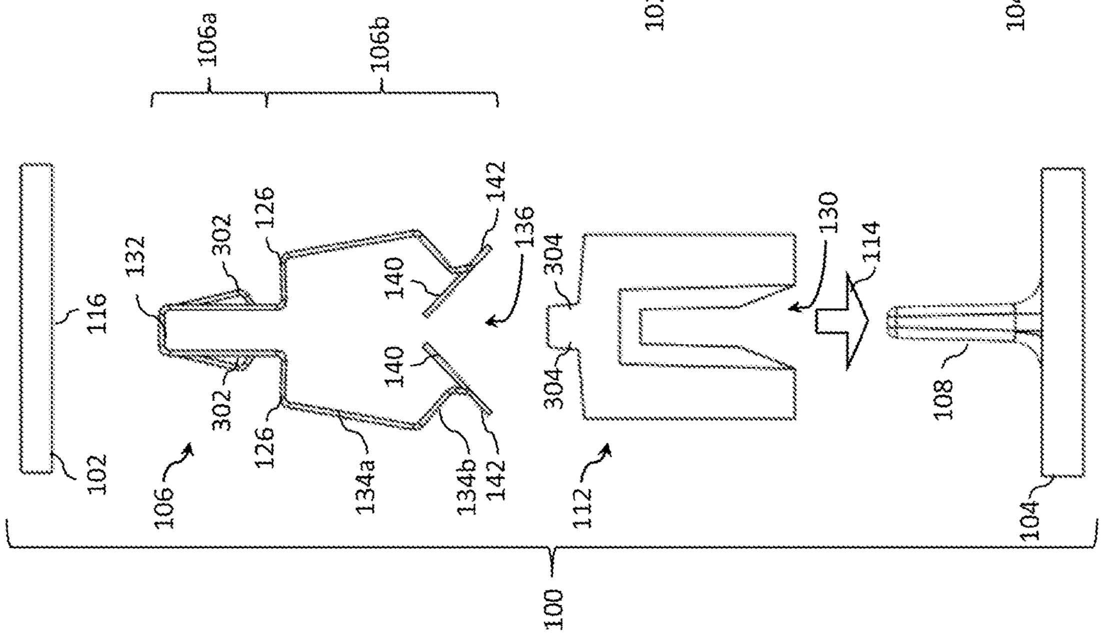

FIG. 3*c* illustrates an elevation assembly view of the fastening system.

Figure 3D:
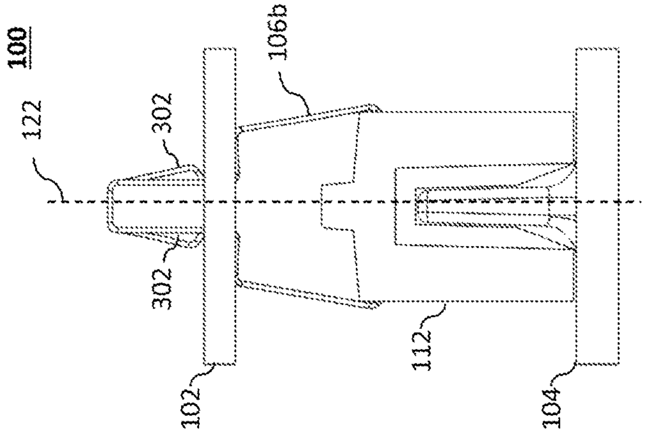

FIG. 3*d* illustrates an elevation partially-assembled view of the fastening system.

Figure 3E:
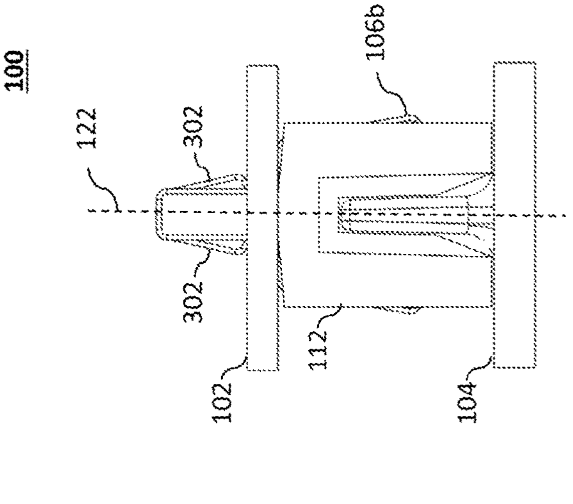

FIG. 3*e* illustrates an elevation assembled view of the fastening system.

Figure 4B:
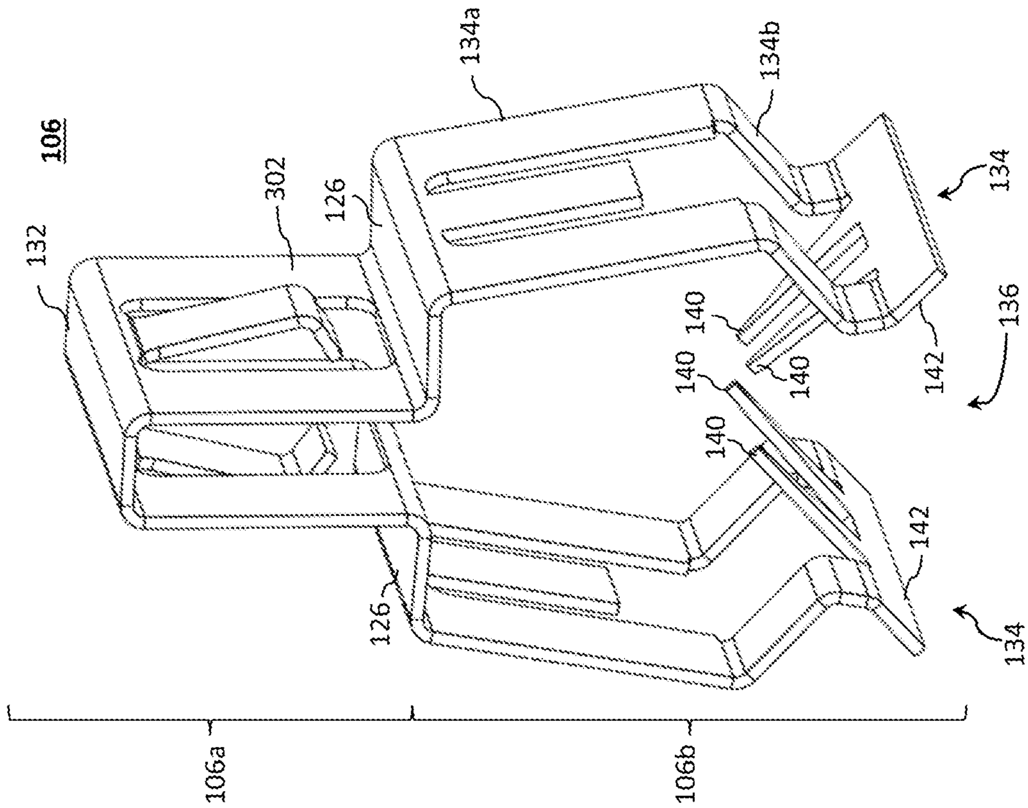
Figure 4A:
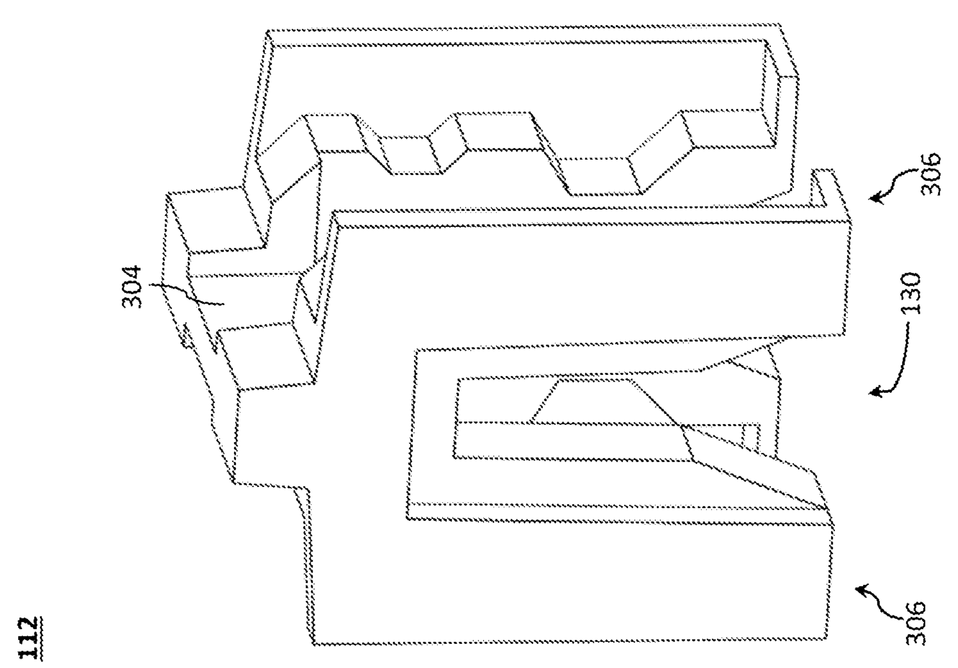
Figure 4D:
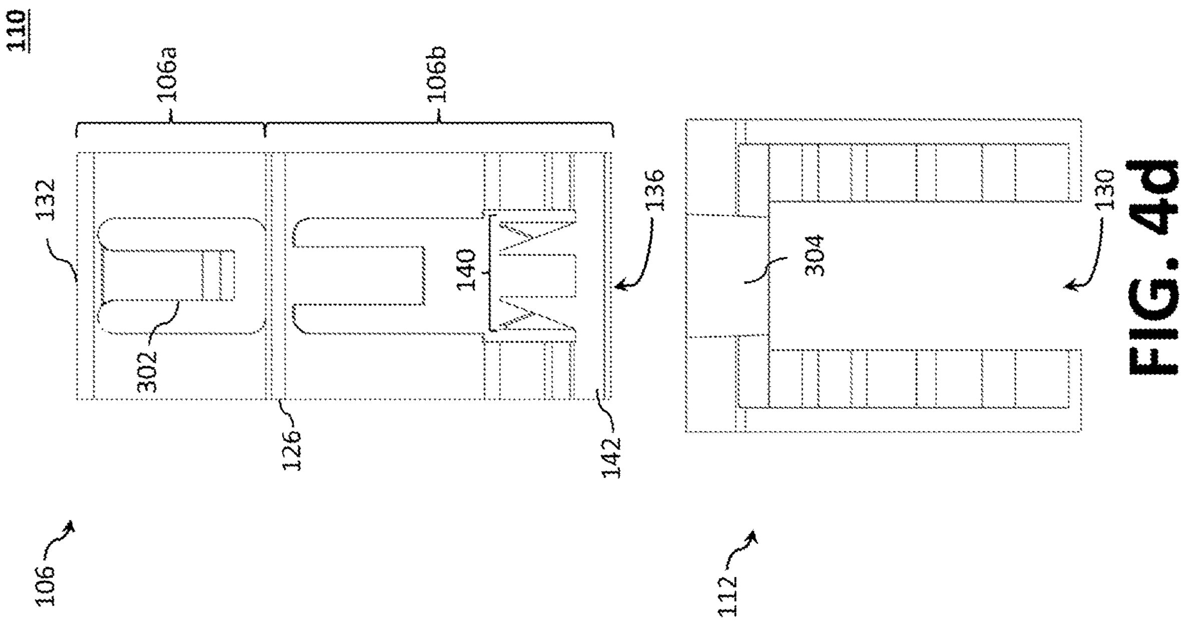
Figure 4C:
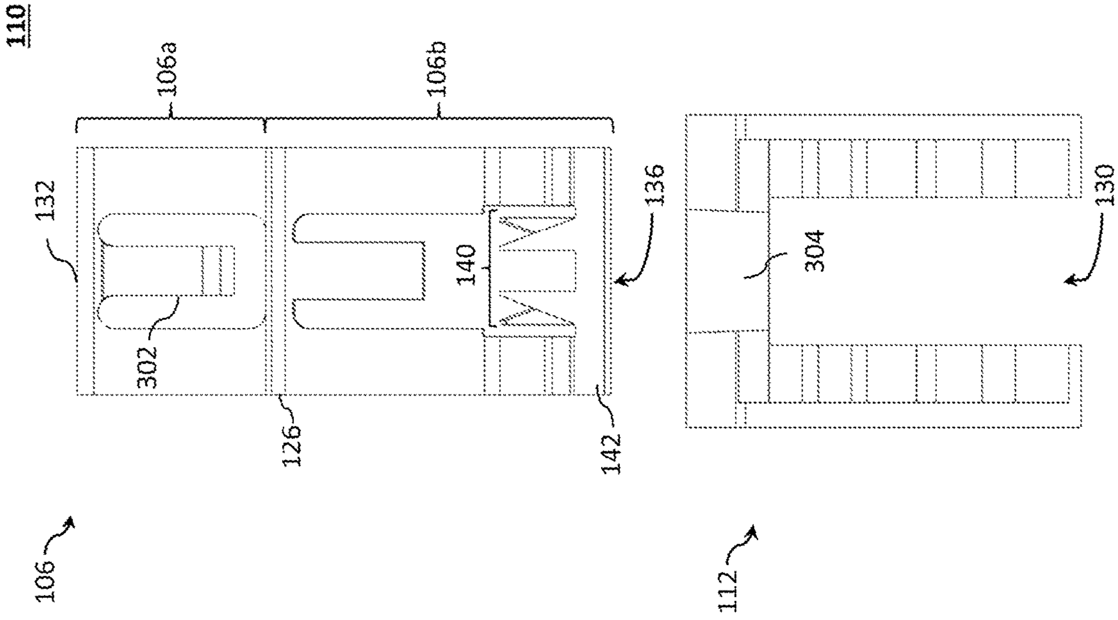

FIG. 4*a* illustrates a topside isometric view of the inner clip of FIGS. 3*a* through 3*e*.

FIG. 4*b* illustrates a topside isometric view of the outer clip.

FIGS. 4*c* through 4*f* illustrate first, second, third, and fourth side elevation assembly views of the clip assembly.

Figure 4F:
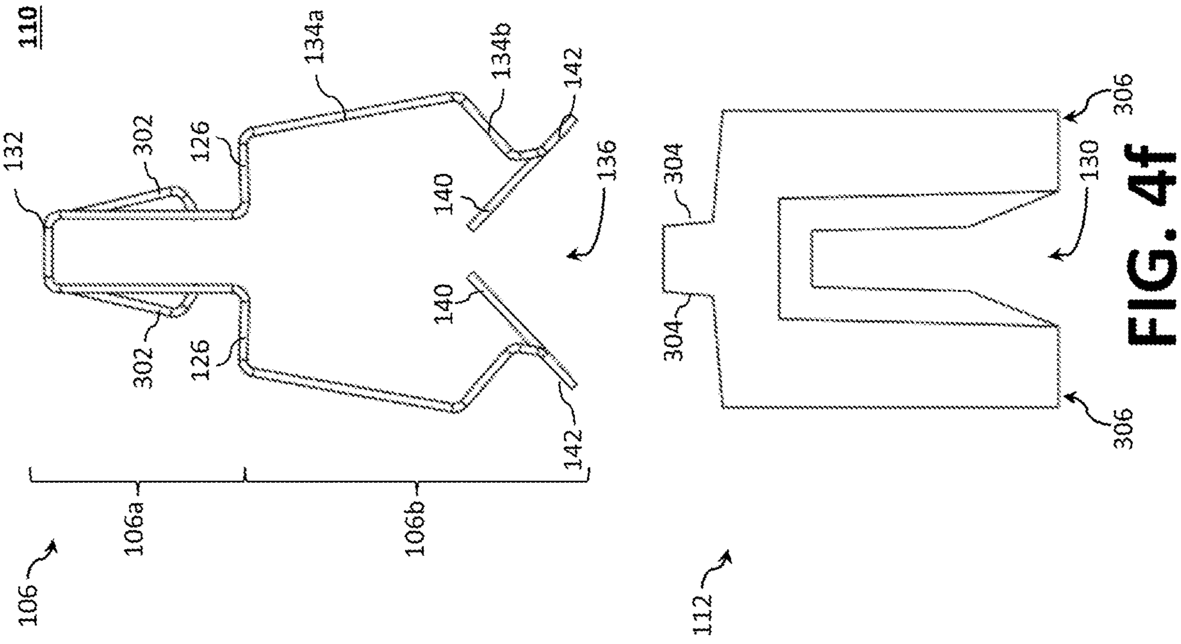
Figure 4E:
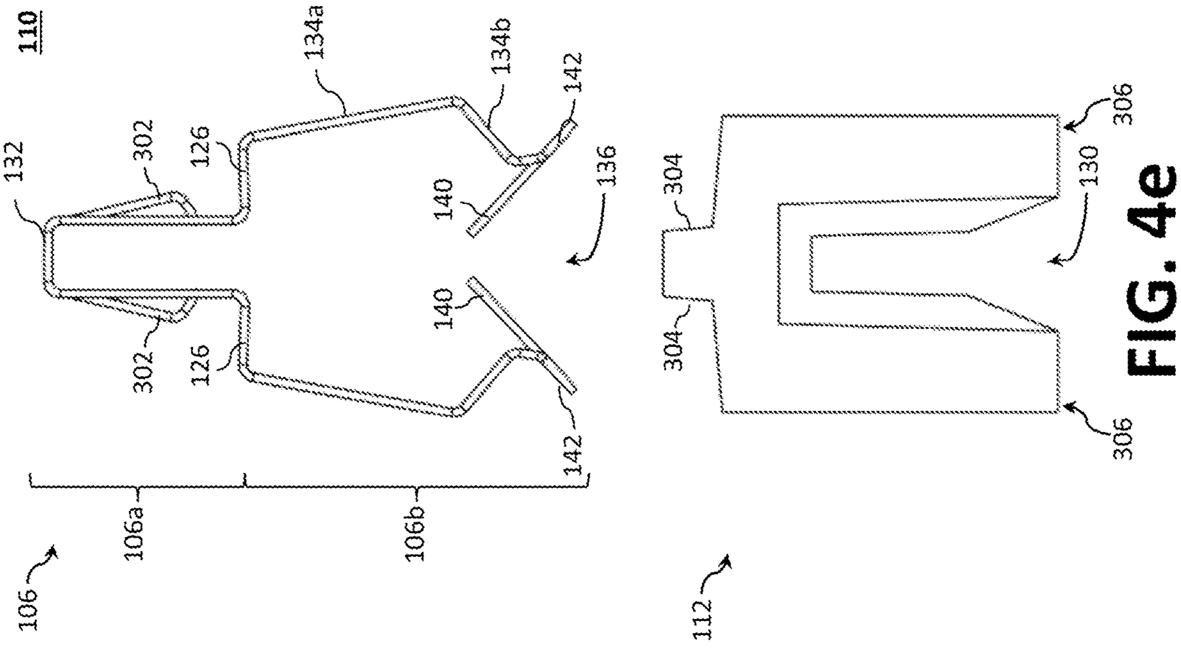
Figure 4G:
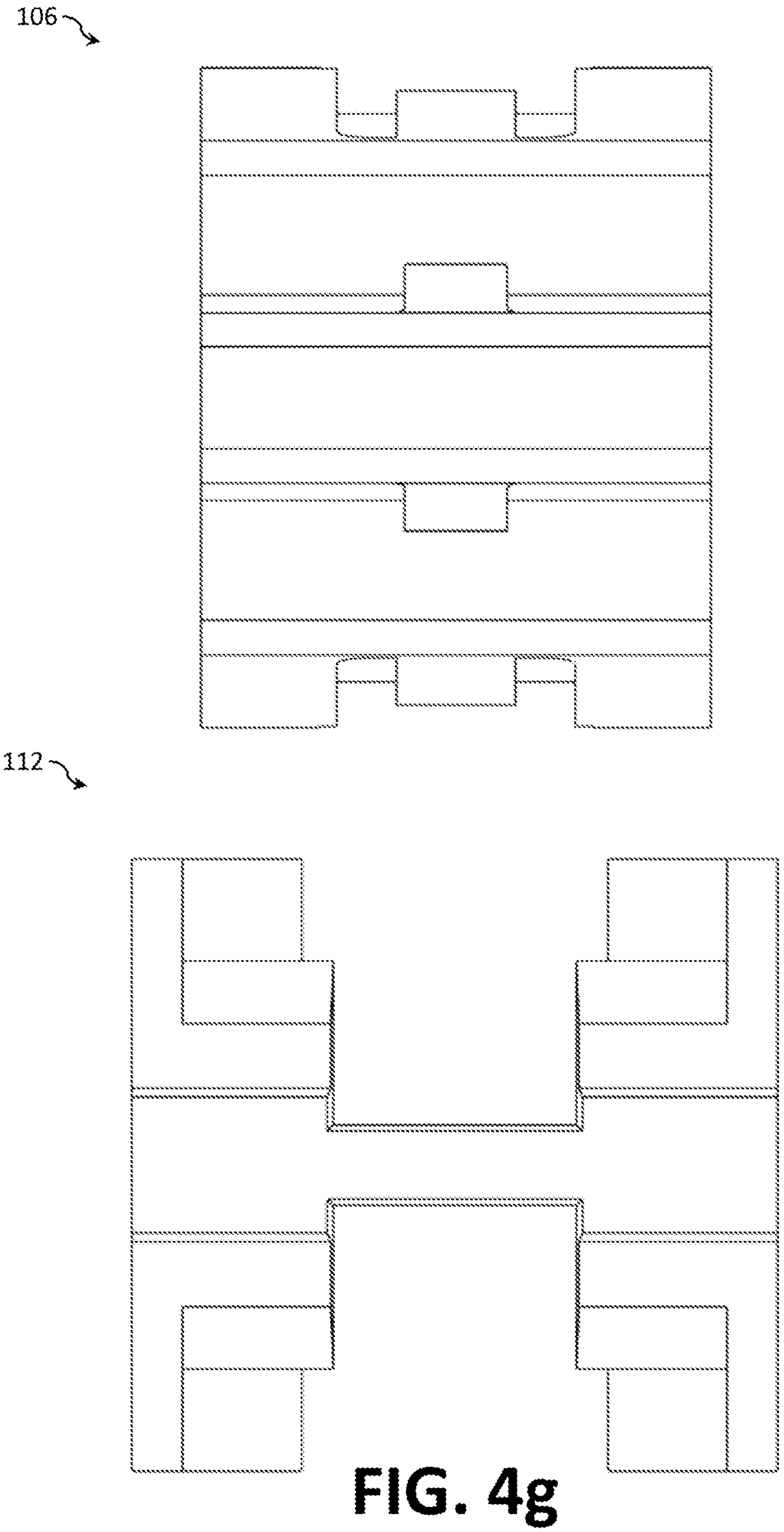

FIG. 4*g* illustrates top plan views of the inner and outer clips.

Figure 4H:
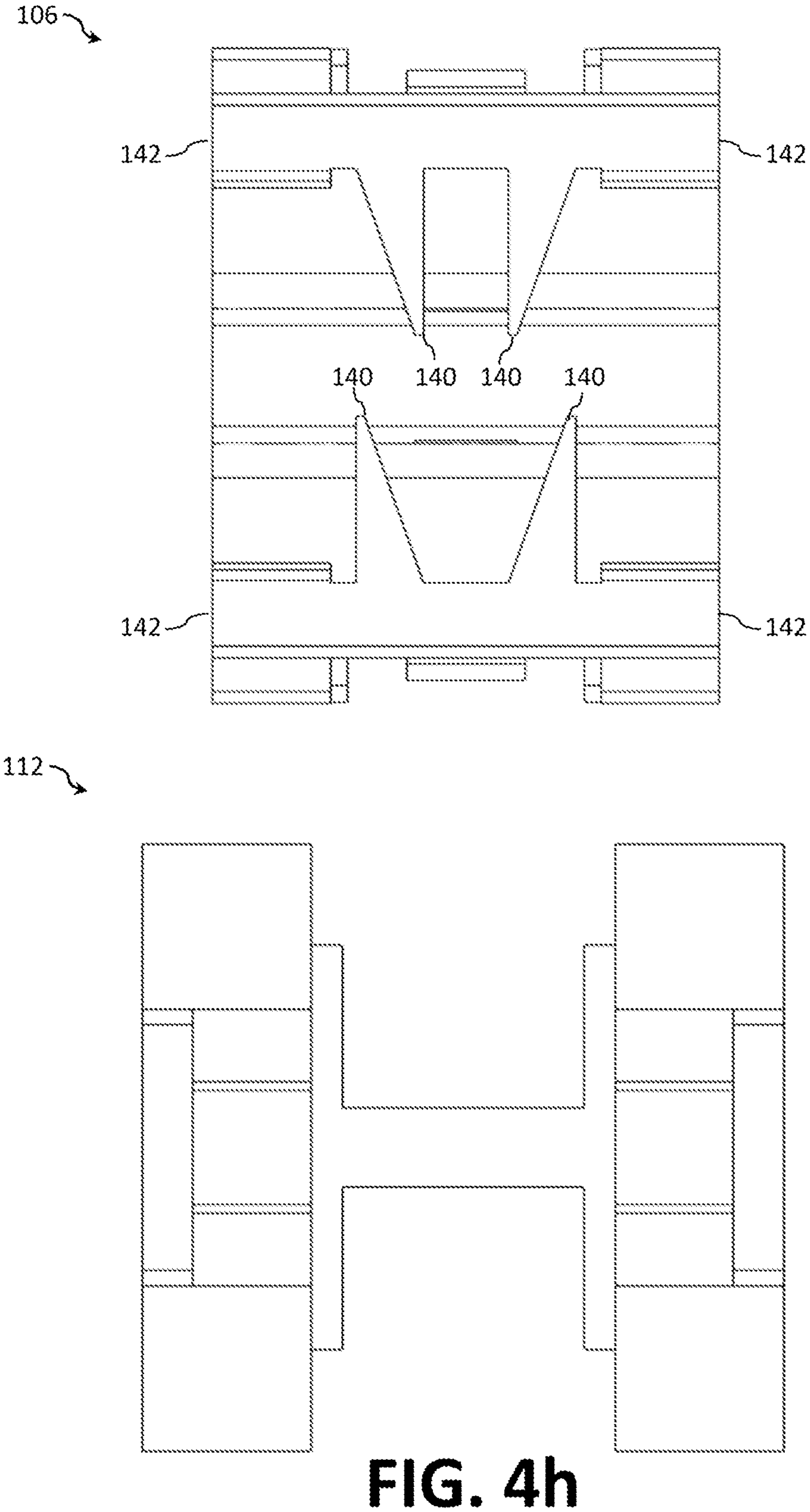

FIG. 4*h* illustrates bottom plan views of the inner and outer clips.

Figure 5C:
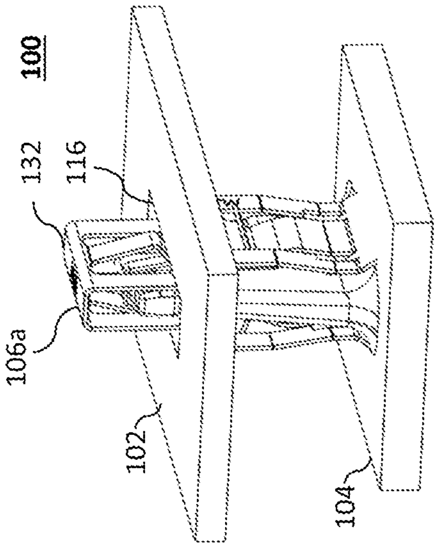
Figure 5B:
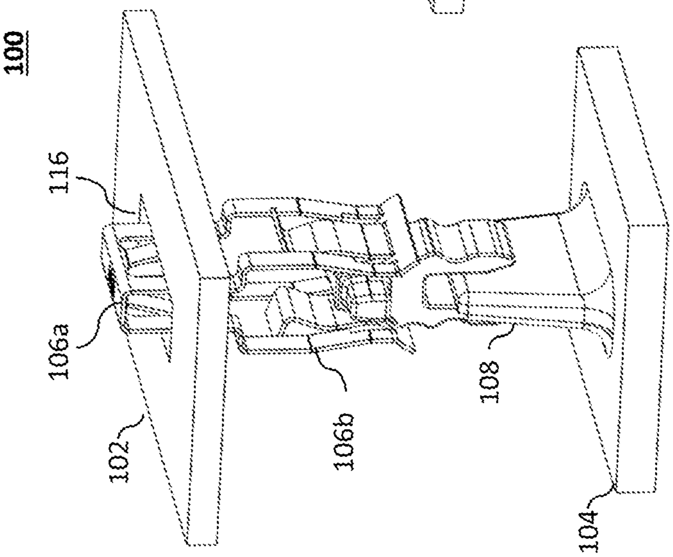
Figure 5A:
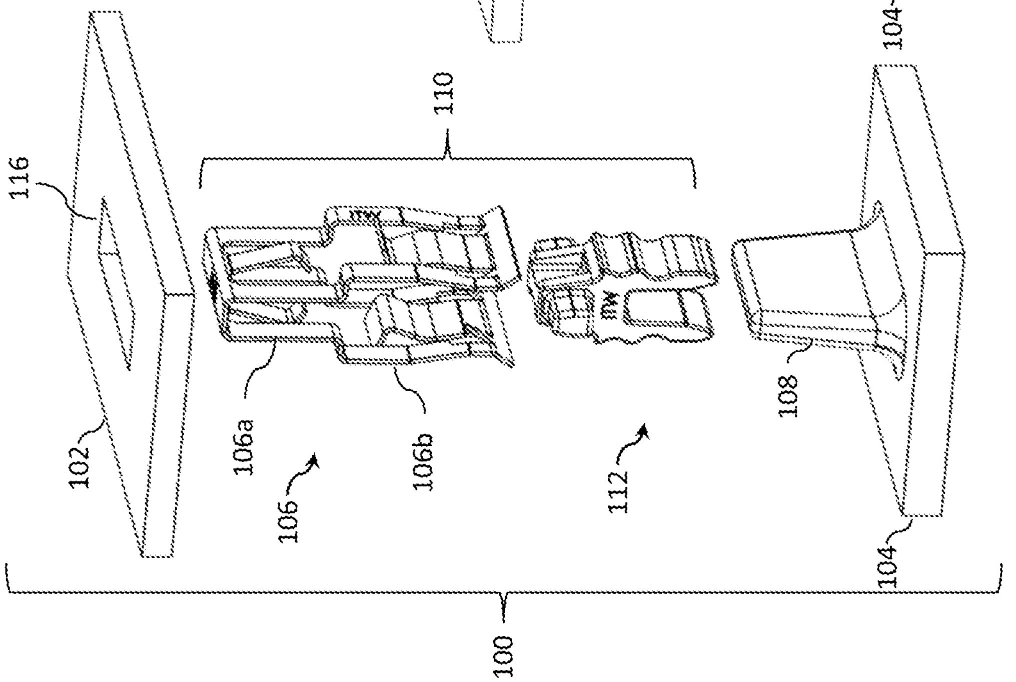

FIG. 5*a* illustrates an elevation assembly view of the fastening system in accordance with another aspect of this disclosure.

FIG. 5*b* illustrates an elevation partially-assembled view of the fastening system.

FIG. 5*c* illustrates an elevation assembled view of the fastening system.

Figure 5F:
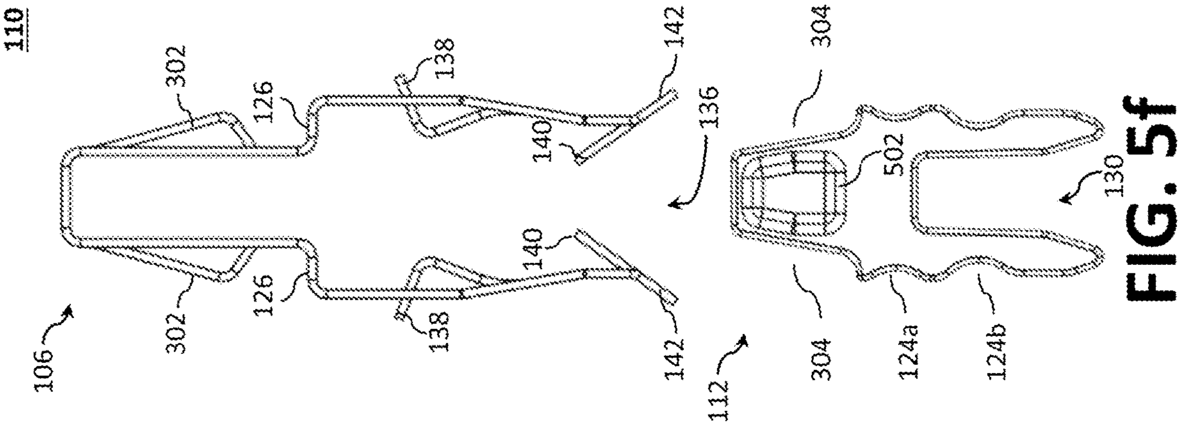
Figure 5E:
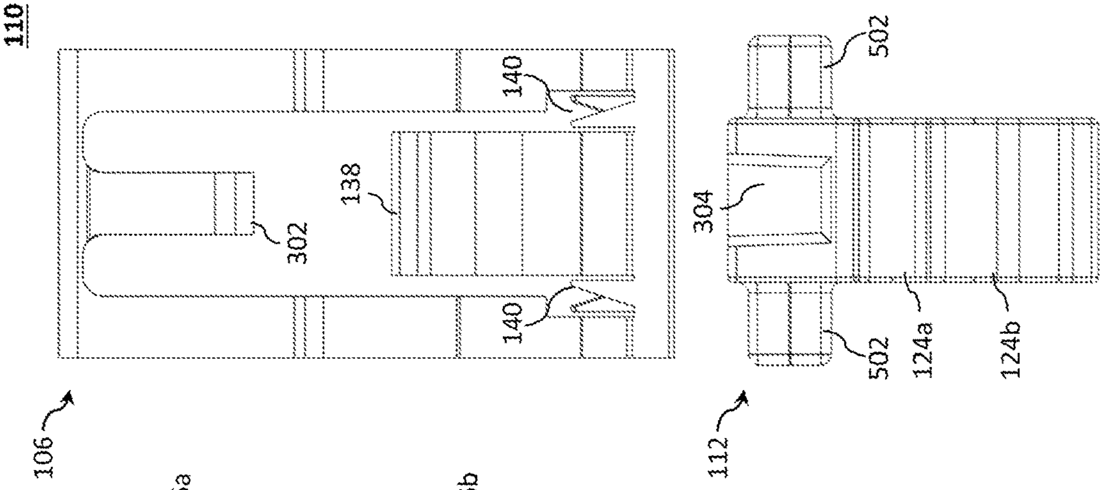
Figure 5D:
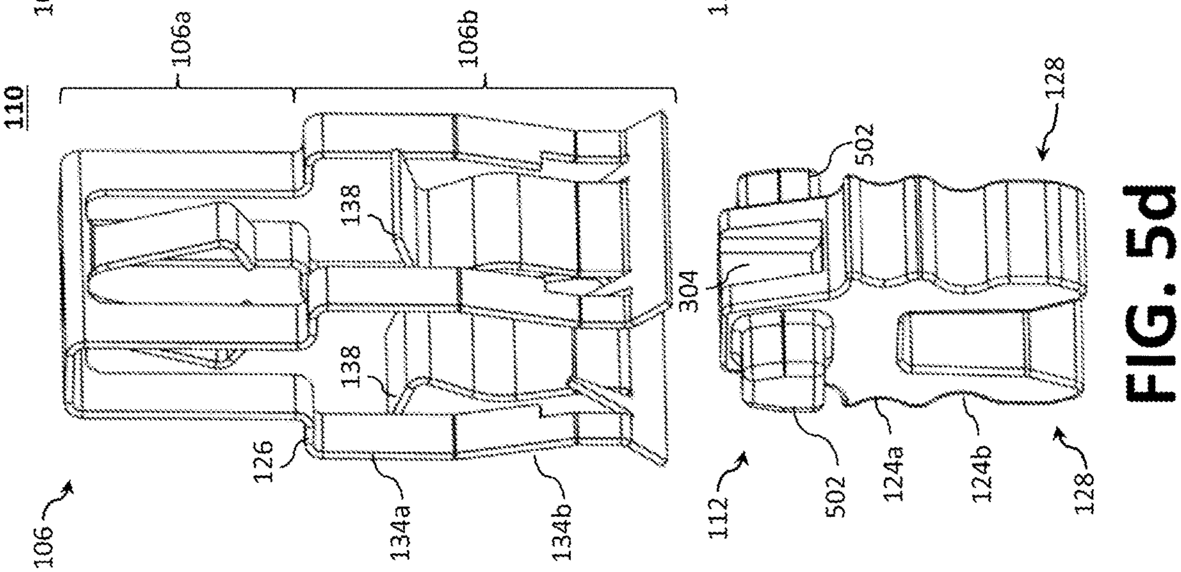

FIG. 5*d* illustrates a perspective assembly view of the fastening system in accordance with another aspect of this disclosure.

FIG. 5*e* illustrates a perspective partially-assembled view of the fastening system.

FIG. 5*f* illustrates a perspective assembled view of the fastening system.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Ribs are a common reinforcement structure for cast and molded components. Using existing rib structure as an attachment point reduces cost and complexity of components. Using clip retainers on soft rib materials, such as cast aluminum, can lead to damage of the soft material, especially when trying to service the clip. The designs set forth in this disclosure, therefore, enable serviceability and attachment, while minimizing damage to the rib. In addition, the manufacturing process of cast ribs provides limitations in the amount of features that can be cost effectively integrated into the rib to aid in clip retention. Because of these lack of features (and the rib usually being straight sided), generating audible, visual, or tactile feedback for assembly verification can be challenging. The designs set forth in this disclosure also provide options for generating assembly verification feedback.

In one example, a clip assembly to couple a first component having an opening to a second component having a rib comprises: an inner clip having a pair of rigid legs defining an inner-clip channel, wherein the inner-clip channel is configured to receive at least a portion of the rib; and an outer clip having a pair of opposing legs resiliently connected via a connecting portion and defining an outer-clip channel, one or more spring tabs, and one or more barbed tabs, wherein the outer-clip channel is configured to receive at least a portion of the inner clip, wherein the one or more spring tabs are configured to engage and secure the inner clip relative to the outer clip, and wherein the one or more barbed tabs are configured to engage and secure the rib relative to the outer clip.

In another example, a clip assembly to couple a first component having an opening to a second component having a rib comprises: a rigid inner clip having a pair of rigid legs defining an inner-clip channel, wherein the rigid inner clip comprise one or more recessed portions, and wherein the inner-clip channel is configured to receive at least a portion of the rib; and an stamped-metal outer clip having a pair of opposing legs resiliently connected via a connecting portion and defining an outer-clip channel, one or more spring tabs, and one or more barbed tabs, wherein the outer-clip channel is configured to receive at least a portion of the rigid inner clip, wherein the one or more spring tabs are configured to engage and secure the rigid inner clip relative to the stamped-metal outer clip via the one or more recessed portions, and wherein the one or more barbed tabs are configured to engage and secure the rib relative to the stamped-metal outer clip.

In yet another example, a stamped-metal outer clip to couple a first component having an opening to a second component having a rib via a rigid inner clip comprises: a connecting portion; and a pair of opposing legs resiliently connected via the connecting portion to define an outer-clip channel, one or more spring tabs, and one or more barbed tabs, wherein the outer-clip channel is configured to receive at least a portion of the rigid inner clip, wherein the one or more spring tabs are canted into the outer-clip channel and configured to engage and secure the rigid inner clip relative to the stamped-metal outer clip via one or more recessed portions formed on the rigid inner clip, and wherein the one or more barbed tabs are configured to engage and secure the rib relative to the stamped-metal outer clip.

In some examples, a portion of the inner clip is configured to pass at least partially through a clip opening formed in the connecting portion.

In some examples, the portion of the inner clip is configured to secure the first component via the opening.

In some examples, the portion of the inner clip comprises one or more engagement surfaces configured to secure with one or more panel tabs of the outer clip.

In some examples, the inner clip defines one or more shoulders configured to support the first component when assembled.

In some examples, the outer clip defines one or more shoulders configured to support the first component when assembled.

In some examples, the one or more spring tabs are canted into the outer-clip channel.

In some examples, the one or more spring tabs are configured to engage the inner clip via one or more recessed portions formed in the inner clip.

In some examples, the one or more recessed portions includes a first recessed portion associated with a pre-captured position and a second recessed portion associated with a locked position.

In some examples, the pair of opposing legs cooperate to define a flared opening to the outer-clip opening configured to guide a distal end of the rib into the outer-clip opening.

In some examples, the outer clip is a stamped-metal clip and/or the inner clip is a rigid plastic clip.

FIGS. 1*a* through 1*d* illustrate a fastening system 100 configured to couple a first component 102 relative to a second component 104 via a clip assembly 110 in accordance with an aspect of this disclosure. In this example, the clip assembly 110 includes an outer clip 106 and an inner clip 112. More specifically, FIGS. 1*a* and 1*b* illustrate, respectively, isometric assembly and assembled views of the fastening system 100 in accordance with an aspect of this disclosure. FIG. 1*c* illustrates an elevation assembly view of the fastening system 100, while FIG. 1*d* illustrates an elevation assembled view of the fastening system 100.

The illustrated fastening system 100 includes the first component 102, the second component 104, and the clip assembly 110. The clip assembly 110 is configured to join the first component 102 and the second component 104. To facilitate attachment via the clip assembly 110, each of the first component 102 and the second component 104 can include one or more engagement features. For example, the first component 102 is illustrated as having an opening 116 formed therein and the second component 104 is illustrated as having one or more ribs 108 from on a surface thereof. For example, the one or more ribs 108 protrude perpendicularly from a surface of the second component 104, which may be a cast structure.

FIG. 2*a* illustrates a topside isometric view of the inner clip 112 of FIGS. 1*a* through 1*d*, while FIG. 2*b* illustrates a topside isometric view of the outer clip 106. FIGS. 2*c* through 2*f* illustrate, respectively, first, second, third, and fourth side elevation assembly views of the clip assembly 110. FIG. 2*g* illustrates top plan views of the inner clip 112 and outer clip 106, while FIG. 2*h* illustrates bottom plan views of the inner clip 112 and outer clip 106. Once advantage of the disclosed outer clip 106 is that it provides a serviceable attachment between the first component 102 and the second component 104 that have one or more ribs 108 (such as plastic or cast materials). The clip assembly 110 may be fabricated in various sizes depending on the application.

The opening 116 can be formed in the first component 102 during manufacturing thereof or added post-manufacture through a mechanical process (e.g., drilling, cutting, carving, etc.). Each rib 108 (sometimes called a blade, tower, or protrusion) may be shaped as a planar tab or a continuous ridge. Depending on the material type, the one or more ribs 108 may be formed during casting, molding, or layup of the second component 104, or attached after fabrication (e.g., using adhesive or mechanical fasteners). After the first component 102 and the second component 104 are assembled, as best illustrated in FIGS. 1*b* and 1*d*, the second component 104 is covered at least partially by the first component 102.

The clip assembly 110 is illustrated as a multi-component retainer clip assembly having the inner clip 112 (e.g., a plastic component) and the outer clip 106 (e.g., a stamped-metal clip). The outer clip 106 is configured to mechanically engage and couple with the first component 102 (e.g., via the rib 108) and with the second component 104 (e.g., via the inner clip 112) by way of, as will be discussed, engagement features formed in or on one or both of the outer clip 106 and the inner clip 112. One advantage of the disclosed clip assemblies 110 is that is can be pre-captured, thus mitigating loss of parts and reducing assembly time and complexity.

The inner clip 112 generally comprises a head portion 112*a* and a clip portion 112*b*. In some examples, the inner clip 112 is a rigid inner clip. In the illustrated example, each of the head portion 112*a* and the clip portion 112*b* comprises or otherwise defines one or more recessed portions configured to engage with the outer clip 106 and/or the first component 102. In the illustrated example, the recessed portions include a first recessed portion 124*a* and a second recessed portion 124*b*. The head portion 112*a* is configured to attach to the first component 102 and, to that end, may comprise one or more shoulders 126 upon which the first component 102 rests when assembled. The one or more shoulders 126 are illustrated as four protruding blocks, although other shapes are contemplated, such as an annular ledge. In some examples, the one or more shoulders 126 can be integrated with the outer clip 106 (examples of which are illustrated starting at FIG. 3*a*).

The one or more shoulders 126 can be situated between the head portion 112*a* and the clip portion 112*b*. In the illustrated example, the clip portion 112*b* comprises a pair of rigid legs 128 separated by an inner-clip channel 130. The inner-clip channel 130 is sized and shaped (or otherwise configured) to receive the rib 108 such that, in some examples, the free end of each of the pair of rigid legs 128 contacts or is adjacent the second component 104 (e.g., at the base of the rib 108) when assembled. In the illustrated examples, the pair of rigid legs 128 are rigidly coupled via the head portion 112*a*, but such legs could be resiliently connected where desired.

The outer clip 106 is formed from a pair of opposing legs 134 that are resiliently connected at their ends via a connecting portion 132 (e.g., a portion that defines the bend, joint, etc.) to form, in one example, a generally U-shaped body having an outer-clip channel 136 (e.g., a U-shaped channel) therebetween. In some examples, the outer clip 106 is a stamped-metal outer clip. The pair of opposing legs 134 are resiliently connected in that the pair of opposing legs 134 default (e.g., spring back) to a predetermined shape. For example, as best illustrated in FIG. 1*c*, the outer clip 106 has a cross section that is generally U-shaped. During assembly, the legs 134 may be biased (e.g., pushed) inward and/or outward, but, in the absence of such external forces, return to the generally U-shaped shape. As illustrated, the pair of legs 134 are generally parallel to one another. Alternatively, the legs 134 may be angled or biased inwardly or outwardly. The outer clip 106 includes engagement features formed in or on each of the pair of legs 134, such as spring tabs 138, barbed tabs 140, guide members 142, etc.

It is contemplated that certain components of the clip assembly 110 may be fabricated as a stamped-metal component using a metal-stamping technique. For example, the outer clip 106 can be fabricated from a single sheet of metal and stamped/bent using a metal-stamping technique, while the inner clip 112 can be fabricated from a plastic material using a plastic injection technique, additive manufacturing, or otherwise. It is contemplated, however, that the inner clip 112 and/or the outer clip 106 could also be fabricated using material extrusion (e.g., fused deposition modeling (FDM), stereolithography (SLA), selective laser sintering (SLS), material jetting, binder jetting, powder bed fusion, directed energy deposition, VAT photopolymerisation, and/or any other suitable type of additive manufacturing/3D printing process.

The first component 102 and the second component 104 may be, for example, automotive panels or other automotive components. Depending on the application, one or both of the first component 102 and/or the second component 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In the automotive industry, example first components 104 include, without limitation, door trim panels, moldings, trim pieces, and other substrates (whether used as interior or exterior surfaces). The second component 104 may be, for example, a frame, an automotive panel, a structural component of a vehicle, such as doors, pillars (e.g., an A-pillar, B-pillar, C-pillar, etc.), dashboard components (e.g., a cross member, bracket, frame, etc.), seat frames, center consoles, fenders, sheet metal framework, or the like. Depending on the application, the first component 102 and/or the second component 104 may be fabricated from, for example, metal (or a metal alloy), synthetic or semi-synthetic polymers (e.g., plastics, such as acrylonitrile butadiene styrene (ABS) and polyvinyl chloride (PVC), etc.), composite materials (e.g., fiber glass), or a combination thereof. In some examples, one or both if the first component 102 and the second component 104 are formed using a casting process, which involves pouring molten metal into a mold to create the desired shape. In the case of a cast automotive frame, the metal is typically cast into a mold that represents the frame's structure.

The clip assembly 110 can be attached to the rib 108 vertically. During installation, the inner clip 112 is passed through a clip opening 120 formed in the connecting portion 132 of the outer clip 106 as indicated by arrow 118 to engage the outer clip 106, which is then ultimately slid over the rib 108 of the second component 102 as indicated by arrow 114 and to engage the rib 108 via an interference fit. In one example, the outer clip 106 initially captures to the inner clip 112 by the spring tabs 138 resting in a first recessed portion 124*a* of the inner clip 112. In this pre-captured state, the barbed tabs 140 on the outer clip 106 are held at a larger width than the width of the rib 108 upon which it will be installed. The clip assembly 110 can be pre-captured to a first component 102 via the head portion 112*a* using one or more attachment techniques, including snaps, adhesive, molding, press-fit, etc. Typically, the outer clip 106 would be retained to the first component 102, but other configurations are possible.

By pressing down on the first component 102, the clip assembly 110 is placed down over the rib 108. The clip assembly 110 initially imparts no grip force on each side of the rib 108. As the first component 102 is being pushed onto the rib 108, the inner clip 112 moves relative to the inner clip 112. The inner clip 112 is ultimately prohibited from moving because the underside of the head portion 112*a* contacts the distal end of the rib 108. This relative motion occurs until the spring tabs 138 on the outer clip 106 fall into a second recessed portion 124*b* on the inner clip 112. The width of the second recessed portion 124*b* is narrow enough that it allows the barbed clips 140 to press against the rib 108, thus providing retention of the clip assembly 110.

A secondary beneficial result of this assembly process is that the head portion 112*a* of the inner clip 112 moves up in relation to the first component 102 to pass through the opening 116, thus providing a visual assembly verification. In addition, a portion of the head portion 112*a* that protrudes above the first component 102 can serve as a retention structure for an addition component, such as a zip tie passing through a cutout or hole in the inner clip 112. For service, the assemble process can be reversed to open the clip barbed tabs 140 and remove the first component 102 (and clip assembly 110) from the rib 108 of the second component 104. For example, a hole could be designed into the inner clip 112 to receive a tool to move or shift the inner clip 112 relative to the outer clip 106 to disengage and/or remove the clip assembly 110 from the rib 108.

The inner clip 112 can be can be fabricated from a rigid, plastic material as a unitary structure to form the head portion 112*a* and the clip portion, and features therefore, such as the pair of rigid legs 128 and one or more shoulders 126. The outer clip 106 may be a stamped retainer clip. For example, a flat sheet of metal may be stamped (e.g., die stamped) to define the outer perimeter, profile, and cutouts to define the various features of the outer clip 106. After stamping, the flat sheet of metal may be bent along one or more lines or at one or more points through one or more steps to define the outer clip 106.

As illustrated, the outer clip 106 generally comprises the pair of opposing legs 134 and the connecting portion 132. In the illustrated example, the connecting portion 132 is generally planar and generally perpendicular to the pair of opposing legs 134. Upon assembly, connecting portion 132 abuts an underside of the first component 102. The connecting portion 132 defines the clip opening 120 through which the inner clip 112 passes to engage the pair of opposing legs 134. The outer clip 106 can be fabricated from a single sheet of metal that is stamped, bent, and extruded to form the various components of the outer clip 106, such as the pair of legs 134, spring tabs 138, barbed tabs 140, guide members 142, etc.; therefore, while described as separate elements, the outer clip 106 can remain a single, unitary structure. In the illustrated example, the connecting portion 132 is coupled to a plurality of resiliently-attached legs 134, including a first leg and a second leg. In operation, the pair of legs 134 cooperate with the inner clip 112 to engage and attach to the rib 108.

To that end, the outer clip 106 can include one or more features to pinch, scrape, dig into, or otherwise grip the rib 108 and/or the inner clip 112. For example, as will be discussed, the outer clip 106 can engage the rib 108 via barbed tabs 140 that dig into the rib 108. Additionally or alternatively, a through-window can be placed in the rib 108 for the one or more barbed tabs 140 (or tabs, where a sharp barb isn't necessary or desired) to snap into or otherwise engage the rib 108 to yield an even higher retention.

The pair of legs 134 can be parallel to the central axis 122 or, as illustrated, canted inward toward the central axis 122 to help pinch the rib 108. In this example, each of the pair of legs 134 includes a first linear portion 134*a* and a second linear portion 134*b* positioned at an angle relative to the first linear portion 134*a*. The first linear portions 134*a* of the illustrated pair of legs 134 are parallel, while the second linear portions 134*b* thereof are canted toward the central axis 122 (i.e., non-parallel). In some examples, the second linear portion 134*b* of the leg 134 can be canted inward toward the central axis 122 by an interior angle that is 2 to 15 degrees, or about 5 to 10 degrees. As best illustrated in FIGS. 2*e* and 2*f*, the legs 134 and the connecting portion 132 define an outer-clip channel 136 configured to receive and, ultimately, retain the inner clip 112 and the rib 108.

Each of the pair of legs 134 can further comprises a clip tab 138 formed therein (e.g., via a die punch) that is canted inward (i.e., into the outer-clip channel 136). During and post assembly, the clip tab 138 is configured to pinch, scrape, dig into, or otherwise grip the inner clip 112 to mitigate pullout.

Each of the illustrated legs 134 includes a guide member 142 angled to help guide a distal end of the rib 108 into the outer-clip channel 136. As best illustrated in FIGS. 2*e* and 2*f*, the guide members 142 cooperate to define a flared opening to the outer-clip channel 136, thus allowing for a degree of misalignment during assembly as the guide members 142 guide the distal end of the rib 108 into the outer-clip channel 136. The flexible nature of the outer clip 106 and angles of the guide members 142 permit a relatively low insertion force required to insert the rib 108 into the outer clip 106. In some example, the insertion force may be about two pounds. As illustrated in FIG. 2*b*, the material use to form the clip tab 138 and barbed tabs 140 can be punched from the material of the respective legs 134.

While each leg 134 is illustrated with one clip tabs 138 and with two barbed tabs 140, it is to be understood that the outer clip 106 may comprise any number of clip tabs 138 and barbed tabs 140 to engage the rib 108 and/or inner clip 112. Further, in some examples, one or more features can be formed in or on the surface of the rib 108 to increase friction. For example, the rib 108 may comprise one or more bumps, recesses, apertures, or ledges to increase friction between the rib 108 and the outer clips 106.

FIGS. 3*a* and 3*b* illustrate, respectively, isometric assembly and assembled views of the fastening system 100 in accordance with another aspect of this disclosure. FIGS. 3*c* through 3*e* illustrate, respectively, elevation assembly, partially-assembled, and assembled views of the fastening system 100.

The fastening system 100 of FIGS. 3*a* through 3*e* is similar to the fastening system 100 of FIGS. 1*a* through 1*d* and FIGS. 2*a* through 2*e* in terms over overall functionality, but with certain variations and differences. For example, like the prior example, the fastening system 100 of FIGS. 3*a* through 3*e* includes a first component 102, a second component 104, and a clip assembly 110 configured to join the first component 102 and the second component 104. In this example, the clip assembly 110 again includes an outer clip 106 and an inner clip 112; however, the outer clip 106 is configured to further engage the first component 102, whereas the inner clip was configured to engage the first component 102 in the prior example. To that end, the shape and various engagement features are adjusted and/or modified accordingly. As with the prior example, the inner clip 112 can be plastic and the outer clip 106 can be stamped-metal.

FIG. 4*a* illustrates a topside isometric view of the inner clip 112 of FIGS. 3*a* through 3*e*, while FIG. 4*b* illustrates a topside isometric view of the outer clip 106. FIGS. 4*c* through 4*f* illustrate, respectively, first, second, third, and fourth side elevation assembly views of the clip assembly 110. FIGS. 4*g* and 4*h* illustrate, respectively, top and bottom plan views of the inner clip 112 and outer clip 106.

The illustrated inner clip 112 comprises a pair of rigid legs 306 separated by an inner-clip channel 130. The inner-clip channel 130 is sized and shaped to receive the rib 108 such that, in some examples, the base of the inner clip 112 contacts or is adjacent the second component 104 (e.g., at the base of the rib 108). The illustrated outer clip 106 generally comprises a pair of opposing legs 134 and a connecting portion 132, where, in the illustrated example, the outer clip 106 generally comprises a head portion 106*a* that defines or includes, inter alia, the connecting portion 132 and a clip portion 106*b* that defines or includes, inter alia, the pair of legs 134. The pair of opposing legs 134 are resiliently connected at their ends via the connecting portion 132. As best illustrated in FIGS. 4*e* and 4*f*, the outer clip 106 defines an outer-clip channel 136 configured to receive and, ultimately, retain the inner clip 112 and the rib 108.

In this example, each of the pair of legs 134 again includes a first linear portion 134*a* and a second linear portion 134*b* positioned at an angle relative to the first linear portion 134*a*. In this example, the interior angle between the first linear portion 134*a* and the second linear portion 134*b* is an obtuse angle, for example, that is greater than 90 degrees and less than or equal to 130 degrees, or about 95 to 120 degrees. The first linear portions 134*a* of the illustrated pair of legs 134 are canted away from the central axis 122 (i.e., non-parallel), while the second linear portions 134*b* thereof are canted toward the central axis 122 (i.e., non-parallel).

In the illustrated example, each of the head portion 106*a* and the clip portion 106*b* comprises or otherwise defines one or more features to engage with the inner clip 112, the first component 102, and/or the second component (e.g., the rib 108). The one or more features include barbed tabs 140, guide members 142, one or more shoulders 126 upon which the first component 102 rests when assembled, and one or more panel tabs 302. In the illustrated example, the head portion 106*a* defines the one or more panel tabs 302, while the clip portion 112 defines barbed tabs 140*a* and guide members 142, with the one or more shoulders 126 being position between the head portion 106*a* and the clip portion 106*b*. As discussed previously, the barbed tabs 140 are configured to engage the rib 108 and/or inner clip 112, whereas the guide members 142 cooperate to define a flared opening to the outer-clip channel 136. In this example, the one or more shoulders 126 are formed as part of the metal clip and serve as a connection portion between the head portion 106*a* and the clip portion 106*b*.

The one or more panel tabs 302 can be punched from the material of the head portion 106*a*. During assembly, the opening 116 formed in the is push over the head portion 106*a*, which causes the one or more panel tabs 302 to bias inwardly and into contact with the inner clip 112 at the engagement surface 304 formed there on, thus forming an interference fit.

During assembly, the outer clip 106 initial captures to the inner clip 112 by spring tabs 138 resting in a first recessed portion 124*a* of the inner clip 112. In this pre-captured state, the barbed tabs 140 on the outer clip 106 are held at a larger width than the width of the rib 108 it will be installed onto. This clip assembly 110 is pre-captured to a first component 102 by outer clip 106 spring tabs 138 snapping through a cutout in the first component 102. The reverse side of the first component 102 is retained by a formed section of a main body of the outer clip 106, such as the one or more panel tabs 302.

By pressing down on the first component 102, the clip assembly 110 is placed down over a rib 108. The clip initially placed no grip force on each side of the rib 108. As the first component 102 is being pushed onto the rib 108, the inner clip 112 moves with relative motion in relation to the inner clip 112. The inner clip 112 is stopped from moving because it rests on the end of the rib 108. This relative motion occurs until the spring tabs 138 on the outer clip 106 fall into a second recessed portion 124*b* on the inner clip 112. The width of the second recessed portion 124*b* is narrow enough that it allows the barbed clips 140 to press against the rib 108 providing retention of the clip assembly 110. The second recessed portion 124*b* provides a locked position.

A secondary beneficial result of this assembly process is that the head portion 112*a* of the inner clip 112 moves up in relation to the first component 102 to pass through the opening 116, thus providing a visual assembly verification. In addition, a portion of the head portion 112*a* that protrudes above the first component 102 can serve as a retention structure for an addition component, such as a zip tie passing through a cutout or hole in the inner clip 112. For service, the assemble process can be reversed to open the clip barbed tabs 140 and remove the first component 102 (and clip assembly 110) from the rib 108 of the second component 104. For example, a hole could be designed into the inner clip 112 to receive a tool to move or shift the inner clip 112 relative to the outer clip 106 to disengage and/or remove the clip assembly 110 from the rib 108.

FIGS. 5*a* through 5*c* illustrate, respectively, elevation assembly, partially-assembled, and assembled views of the fastening system 100 in accordance with another aspect of this disclosure, while FIGS. 5*d* through 5*e* illustrate perspective views thereof. The fastening system 100 of FIGS. 5*a* through 5*e* is similar to the fastening system 100 of the prior examples in terms over overall functionality, but with certain exceptions and differences. For example, in this example, the inner clip 112 is sized and shaped to extend deeper into the head portion 106*a* of the outer clip 106. For example, the leading end of the inner clip 112 can abut the underside of the leading end of the outer clip 106 (e.g., the underside of the connecting portion 132. The inner clip 112 can further define a pair of ears to abut an underside surface of the first component 102, thus improving stability and mitigating wobble.

In this example, each of the pair of legs 134 again includes a first linear portion 134*a* and a second linear portion 134*b* positioned at an angle relative to the first linear portion 134*a*. In this example, the interior angle between the first linear portion 134*a* and the second linear portion 134*b* is an obtuse angle, for example, that is greater than 135 degrees and less than 180 degrees, or about 150 to 170 degrees. The first linear portions 134*a* of the illustrated pair of legs 134 are parallel to the central axis 122, while the second linear portions 134*b* thereof are canted toward the central axis 122 (i.e., non-parallel).

In some examples, a method of manufacturing an outer clip 106 to couple a first component 102 to a second component 104 via an inner clip 112 would start with stamping a sheet of metal to form a die cutout for the outer clip 106. The die cutout is generally planar and resides in a plane (e.g., a single plane) and is shaped to define portions that correspond to the various components of the outer clip 106, such as the pair of legs 134, spring tabs 138, barbed tabs 140, guide members 142, etc. The sheet of metal may be stamped via a press and die. In other examples, the die cutout may be cut from sheet of metal using lasers, water jets, jigsaw, etc. Next, the various features are bent along multiple fold lines during multiple steps to produce the outer clip 106.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

The invention claimed is:

1. A clip assembly to couple a first component having an opening to a second component having a rib, the clip assembly comprising:

an inner clip having a pair of rigid legs defining an inner-clip channel, wherein the inner-clip channel is configured to receive at least a portion of the rib; and an outer clip having a pair of opposing legs resiliently connected via a connecting portion and defining an outer-clip channel, one or more spring tabs, and one or more barbed tabs, wherein the outer-clip channel is configured to receive at least a portion of the inner clip, wherein the one or more spring tabs are configured to engage and secure the inner clip relative to the outer clip, wherein the inner clip comprises one or more recessed portions configured to receive the one or more spring tabs, and wherein the one or more barbed tabs are configured to engage and secure the rib relative to the outer clip.

2. The clip assembly of claim 1, wherein a portion of the inner clip is configured to pass at least partially through a clip opening formed in the connecting portion.

3. The clip assembly of claim 2, wherein a portion of the inner clip is configured to secure the first component via the first component opening.

4. The clip assembly of claim 2, wherein the portion of the inner clip comprises one or more engagement surfaces configured to secure with one or more panel tabs of the outer clip.

5. The clip assembly of claim 1, wherein the inner clip defines one or more shoulders configured to support the first component when assembled.

6. The clip assembly of claim 1, wherein the outer clip defines one or more shoulders configured to support the first component when assembled.

7. The clip assembly of claim 1, wherein the one or more spring tabs are canted into the outer-clip channel.

8. The clip assembly of claim 1, wherein the one or more recessed portions includes a first recessed portion associated with a pre-captured position and a second recessed portion associated with a locked position.

9. The clip assembly of claim 1, wherein the pair of opposing legs cooperate to define a flared opening to the outer-clip opening configured to guide a distal end of the rib into the outer-clip opening.

10. The clip assembly of claim 1, wherein the outer clip is a stamped-metal clip.

11. The clip assembly of claim 1, wherein the inner clip is a rigid plastic clip.

12. A clip assembly to couple a first component having an opening to a second component having a rib, the clip assembly comprising:

a rigid inner clip having a pair of rigid legs defining an inner-clip channel, wherein the rigid inner clip comprise one or more recessed portions, and wherein the inner-clip channel is configured to receive at least a portion of the rib; and a stamped-metal outer clip having a pair of opposing legs resiliently connected via a connecting portion and defining an outer-clip channel, one or more spring tabs, and one or more barbed tabs, wherein the outer-clip channel is configured to receive at least a portion of the rigid inner clip, wherein the one or more spring tabs are configured to engage and secure the rigid inner clip relative to the stamped-metal outer clip via the one or more recessed portions, and wherein the one or more barbed tabs are configured to engage and secure the rib relative to the stamped-metal outer clip.

13. The clip assembly of claim 12, wherein a portion of the rigid inner clip is configured to pass at least partially through a clip opening formed in the connecting portion and to secure the first component via the opening.

14. The clip assembly of claim 12, wherein the rigid inner clip comprises one or more engagement surfaces configured to secure with one or more panel tabs of the stamped-metal outer clip.

15. The clip assembly of claim 12, wherein the one or more recessed portions includes a first recessed portion associated with a pre-captured position and a second recessed portion associated with a locked position.

16. A stamped-metal outer clip to couple a first component having an opening to a second component having a rib via a rigid inner clip, the stamped-metal outer clip comprising:

a connecting portion; and a pair of opposing legs resiliently connected via the connecting portion to define an outer-clip channel, one or more spring tabs, and one or more barbed tabs, wherein the outer-clip channel is configured to receive at least a portion of the rigid inner clip, wherein the one or more spring tabs are canted into the outer-clip channel and configured to engage and secure the rigid inner clip relative to the stamped-metal outer clip via one or more recessed portions formed on the rigid inner clip, and wherein the one or more barbed tabs are configured to engage and secure the rib relative to the stamped-metal outer clip.

17. The stamped-metal outer clip of claim 16, wherein the one or more spring tabs are configured to engage the rigid inner clip via the one or more recessed portions formed in the rigid inner clip.

18. The stamped-metal outer clip of claim 16, wherein the pair of opposing legs cooperate to define a flared opening to the outer-clip opening configured to guide a distal end of the rib into the outer-clip opening.

19. The stamped-metal outer clip of claim 16, wherein the stamped-metal outer clip defines one or more shoulders configured to support the first component when assembled.

* * * * *